United States Patent
Carrieres (10) Patent No.: US 10,116,838 B2
(45) Date of Patent: *Oct. 30, 2018

(54) METHOD AND APPARATUS FOR PROVIDING SIGNATURES OF AUDIO/VIDEO SIGNALS AND FOR MAKING USE THEREOF

(71) Applicant: Grass Valley Canada, Toronto (CA)

(72) Inventor: Pascal Carrieres, Pierrefonds (CA)

(73) Assignee: GRASS VALLEY CANADA, Toronto (CA)

( * ) Notice: Subject to any disclaimer, the term of this patent is extended or adjusted under 35 U.S.C. 154(b) by 333 days.

This patent is subject to a terminal disclaimer.

(21) Appl. No.: 14/509,865

(22) Filed: Oct. 8, 2014

(65) Prior Publication Data

US 2015/0022720 A1    Jan. 22, 2015

Related U.S. Application Data

(63) Continuation of application No. 12/627,728, filed on Nov. 30, 2009, now Pat. No. 8,860,883.

(51) Int. Cl.
*H04N 9/475* (2006.01)
*H04N 5/04* (2006.01)
*H04N 17/00* (2006.01)

(52) U.S. Cl.
CPC .............. *H04N 5/04* (2013.01); *H04N 17/00* (2013.01)

(58) Field of Classification Search
CPC ................................. H04N 5/04; H04N 17/00
See application file for complete search history.

(56) References Cited

U.S. PATENT DOCUMENTS

| | | | |
|---|---|---|---|
| 4,187,396 A * | 2/1980 | Luhowy | G10L 25/78 381/94.8 |
| 4,931,871 A | 6/1990 | Kramer | |
| 5,126,990 A * | 6/1992 | Efron | G06F 11/277 324/73.1 |
| 5,585,859 A | 12/1996 | Ward et al. | |
| 6,377,297 B1 | 4/2002 | Janko et al. | |
| 6,493,872 B1 * | 12/2002 | Rangan | G06T 7/2033 348/563 |

(Continued)

FOREIGN PATENT DOCUMENTS

| WO | WO-02/097792 | 12/2002 |
| WO | WO-2005/046201 | 5/2005 |

(Continued)

OTHER PUBLICATIONS

Canadian Exam Report on 2686869 dated Feb. 4, 2016.
(Continued)

*Primary Examiner* — Brian Yenke
*Assistant Examiner* — Humam Satti
(74) *Attorney, Agent, or Firm* — Daniel Rose Foley & Lardner LLP (57) ABSTRACT

A method and apparatus are disclosed for providing a video signature representative of a content of a video signal. A method and apparatus are further disclosed for providing an audio signature representative of a content of an audio signal. A method and apparatus for detecting lip sync are further disclosed and take advantage of the method and apparatus disclosed for providing a video signature and an audio signature.

14 Claims, 8 Drawing Sheets

(56) References Cited

U.S. PATENT DOCUMENTS

| | | |
|---|---|---|
| 6,636,617 B1 | 10/2003 | Sugahara et al. |
| 8,682,651 B2 * | 3/2014 | Diggins .................. 704/200 |
| 2003/0035064 A1 | 2/2003 | Torikoshi et al. |
| 2004/0148159 A1 | 7/2004 | Crockett et al. |
| 2004/0227856 A1 | 11/2004 | Cooper |
| 2004/0240562 A1 | 12/2004 | Bargeron et al. |
| 2005/0177372 A1 * | 8/2005 | Wang ................. G06K 9/00536 704/273 |
| 2006/0020710 A1 * | 1/2006 | Rabenold ......... H04N 21/23439 709/236 |
| 2006/0075237 A1 | 4/2006 | Seo et al. |
| 2007/0064956 A1 | 3/2007 | Iwata |
| 2007/0153125 A1 | 7/2007 | Cooper et al. |
| 2008/0187234 A1 * | 8/2008 | Watanabe ............ H04N 1/3876 382/254 |
| 2008/0211578 A1 * | 9/2008 | Morishima ............ H02M 3/157 341/143 |
| 2008/0309819 A1 | 12/2008 | Hardacker et al. |
| 2009/0141805 A1 * | 6/2009 | Lu .................... G06F 17/30781 375/240.24 |
| 2009/0225994 A1 * | 9/2009 | Topchy ................. G10L 25/48 381/56 |
| 2009/0234649 A1 * | 9/2009 | Goodhew ............ G10L 19/018 704/243 |
| 2011/0026763 A1 | 2/2011 | Diggins |
| 2011/0032984 A1 * | 2/2011 | Dorman ............... H04N 19/176 375/240.2 |
| 2011/0106587 A1 | 5/2011 | Lynch et al. |
| 2011/0261257 A1 | 10/2011 | Terry et al. |

FOREIGN PATENT DOCUMENTS

| | | | |
|---|---|---|---|
| WO | WO-2007/148888 A1 | 12/2007 | |
| WO | WO-2008/066930 A2 | 6/2008 | |
| WO | WO 2008066930 A2 * | 6/2008 | ....... G06F 17/30787 |
| WO | WO-2009/104022 | 8/2009 | |

OTHER PUBLICATIONS

Examination Report for CA 2,686,869 dated Feb. 20, 2017.
Combined Search and Examination Report for U.K. Patent Application No. 1403468.0, dated Mar. 18, 2014, 7 pages.
Combined Search and Examination Report under Sections 17 & 18(3) for UK Application No. GB1407414.0, dated Jul. 4, 2014, 3 pages.
Examination Report Under Section 18(3) for U.K. Patent Application No. 1210285.1, dated Jan. 10, 2014, 3 pages.
International Preliminary Report on Patentability for International Application No. PCT/CA2010/001876, dated Jun. 5, 2012, 7 pages.
International Search Report and Written Opinion for International Application No. PCT/CA2010/001876, dated Mar. 2, 2011, 10 pages.
U.S. Notice of Allowance for U.S. Appl. No. 12/627,728 dated May 29, 2014.
U.S. Office Action for U.S. Appl. No. 12/627,728 dated Jun. 3, 2013.

\* cited by examiner

FIG 3A $$VS_i(f) = \frac{\sum_{k=1}^{N} \left( |P_k - C_k| \quad \begin{matrix} 1 \text{ (if > 32)} \\ 0 \text{ otherwise} \end{matrix} \right)}{N / 15}$$

FIG. 7B $VMF' = function(E_{V(t)}, Min(E_{V(t)}))$

FIG. 8B $AMF' = function(E_{A(t)}, Min(E_{A(t)}))$

FIG. 8C

METHOD AND APPARATUS FOR PROVIDING SIGNATURES OF AUDIO/VIDEO SIGNALS AND FOR MAKING USE THEREOF

RELATED APPLICATIONS

The present application claims priority to and is a continuation of co-pending U.S. patent application Ser. No. 12/627,728, entitled "Method and Apparatus for Providing Signatures of Audio/Video Signals and for Making Use Thereof," filed Nov. 30, 2009, which is hereby incorporated by reference in its entirety.

FIELD OF THE INVENTION

The invention relates to the processing of audio and video signals. More precisely, this invention pertains to a method and apparatus for providing signatures of audio/video signals and to a method and apparatus for using the provided signatures for detecting lip sync.

BACKGROUND OF THE INVENTION

Being able to detect differences in signals is of great interest for the skilled addressee. In the case of audio/video signals, differences may occur due to various reasons.

For instance, an audio signal may become desynchronized with a corresponding video signal during the course of a transmission of the audio/video signal. Such phenomenon is known by the skilled addressee as lip sync. Detecting lip sync may be of great interest tor multiple system operators (MSG) that are looking for example to improve the quality of their channels and to avoid a phenomenon unacceptable at a certain degree for the end user.

Unfortunately, many prior art references for detecting lip sync disclose techniques that are either cumbersome to implement or require excessive processing resources.

Of interest though is PCT application WO 2003/088930 which discloses extracting features of audio and video signal content to provide reliable identification of the signals. In this international application a plurality of intermediate values are extracted. Those intermediate values represent one or more measures of dissimilarities between first and second values. Signatures are then generated by applying a hashing function on those intermediates values.

Unfortunately, the processing associated with such signature generation requires extensive processing capabilities which may not be acceptable in the case of certain applications wherein fast processing and limited processing capabilities are required.

There is therefore a need for a method and apparatus that will overcome at least one of the above-identified drawbacks.

Features of the invention will be apparent from review of the disclosure, drawings and description of the invention below.

BRIEF SUMMARY

It is an object of the invention to provide a method and apparatus for generating a video signature representative of a content of a video signal.

The content of a video signal should be understood as an indication of an evolution of the content of the video signal over time.

Yet another object of the invention is to provide a method and apparatus for generating a signature representative of a content of art audio signal.

Similarly, the content of an audio signal should be understood as an indication of an evolution of the content of the audio signal over time.

The invention provides a method for generating a video signature representative of a content of a video signal, the method comprising receiving pixel data of each of a plurality of given pixels In a first image of the video signal, receiving pixel data of each of the plurality of given pixels in a second image subsequent to the first image, for each given pixel of the plurality of given pixels, comparing corresponding pixel data of the given pixel of the first image with the corresponding pixel data of the given pixel in the second Image to provide a corresponding indication of a difference between the pixel data of the given pixel of the first image and the pixel data of the given pixel in the second image; if the difference is greater than a threshold, incrementing a counter and providing an indication of the counter to thereby generate the video signature.

An advantage of the method disclosed is that such method may he used for providing information, i.e. a signature, for characterizing the content of the video signal. When signatures are used for characterizing each of two video signals, those signatures may be advantageously correlated and in turn be used for detecting a delay between the two video signals which Is of great advantage.

Another advantage of the method disclosed is that it requires limited processing for generating the signature which is therefore of great advantages.

In accordance with an embodiment, the method further comprises selecting a plurality of given pixels according to at least one criteria.

In accordance with an embodiment the at least one criteria comprises a spatial criteria.

In yet another embodiment the threshold is equal to thirty two (32).

in another embodiment of the method, the providing of the indication of the counter comprises normalizing the indication of the counter.

The invention further provides a method for generating an audio signature representative of a content of an audio signal, the method comprising receiving an audio signal; performing a first filtering of the audio signal to provide a first filtered audio signal; performing a second filtering of the audio signal to provide a second filtered audio signal; comparing the first filtered audio signal to the second filtered audio signal and assigning a value depending on the comparison to thereby generate the audio signature representative of the content of the audio signal.

An advantage of the method disclosed is that such method may be used for providing information, i.e. a signature, for characterizing the content of the audio signal. When signatures are used for characterizing each of two audio signals, those two signatures may he advantageously correlated and in turn be used for detecting a delay between the two audio signals which is of great advantage.

Other advantages of the method disclosed above are that the method requires limited processing resources and limited storing capabilities for generating the signature which is of great advantage over the prior art.

An advantage of the method disclosed is that such method may be used for defecting lip sync between a first audio/video signal and a second audio/video signal. By computing a first delay between the first audio signal and the second audio signal and a second delay between the first video signal and the second video signal and comparing the first and second delays it is possible to obtain an indication of the lip sync, if applicable.

In one embodiment of the method, the first filtering comprises detecting an envelope signal of the received audio signal.

In yet another embodiment of the method, the second filtering comprises computing an average value of the received audio signal.

In yet another embodiment, the assigning of a value depending on the comparison to thereby generate the audio signature representative of the content of the audio signal comprises performing decimation.

There is further disclosed an audio signature extraction unit for providing an audio signature signal $AS_i$ representative of a content of an audio signal $A_i$, the audio signature extraction unit comprising a first filtering unit for receiving the audio signal $A_i$ and for providing a first filtered signal; a second filtering unit for receiving the audio signal $A_i$ and providing a second filtered signal; a comparator for receiving the first filtered signal and the second filtered signal and for performing a comparison of the first filtered with the second filtered signal and for providing a comparison result to thereby provide the audio signature signal $AS_i$ representative of a content of an audio signal.

In one embodiment of the audio signature extraction unit, the first filtering unit comprises an envelope detector for providing a signal $E_s$ indicative of an envelope of the audio signal $A_i$.

In another embodiment of the audio signature extraction unit, the second filtering unit comprises a mean detector for providing a signal $M_s$ indicative of a mean the audio signal $A_i$.

In yet another embodiment of the audio signature extraction unit, the audio signature extraction unit further comprises an absolute value providing unit for receiving the audio signal $A_i$ and for providing a signal indicative of an absolute value of the value of the audio signal $A_i$; wherein each of the mean detector and the envelope detector receives the signal indicative of an absolute value of the value of the audio signal $A_i$.

In yet another embodiment of the audio signature extraction unit, the audio signature extraction unit further comprises a decimator for receiving the audio signature signal $AS_i$ and for decimating the audio signature signal $AS_i$.

There is further disclosed a video signature extraction unit for providing a video signature signal $VS_i$ representative of a content of an incoming image signal $V_i$, the video signature extraction unit comprising a first image pixel data providing unit for receiving the incoming image signal $V_i$ and for providing a corresponding pixel data $P_k$ of a pixel k of a plurality of given pixels 1 to N of a first image; a second image pixel data providing unit for receiving the incoming image signal $V_i$ and for providing a corresponding pixel data $C_k$ of the corresponding given pixel k in a second image; a comparator for receiving the corresponding pixel data $P_k$ and the corresponding pixel data $C_k$ and for comparing the corresponding pixel data $P_k$ with the corresponding pixel data $C_k$ to provide an a result signal indicative of the comparison; a counter for receiving and counting the result signal of each of the plurality of given pixels 1 to N and for providing: a counter signal and a video signature providing unit for receiving the counter signal and for providing the video signature signal $VS_i$.

In one embodiment of the video signature extraction unit, the result signal is a logic value one (1) if $Abs(P_k-C_k)$ is greater than thirty two (32) and a logic value zero (0) otherwise.

In yet another embodiment of the video signature extraction unit, the video signature providing unit receives the counter signal and divides the counter signal by N/15, wherein N is the number of given pixels.

In yet another embodiment of the video signature extraction unit, the video signature extraction unit further comprises a windowing unit for receiving the incoming image signal $V_i$ and for providing a selected signal $W_i$.

There is further provided an apparatus for providing an indication of a lip sync, the apparatus comprising a first audio signature extraction unit for receiving a first audio signal and a first video signal and for providing a first video signature and a first audio signature; a second signature extraction unit for receiving a second audio signal and a second video signal and for providing a second video signature and a second audio signature and a signature analysis unit for receiving the first video signature, the first audio signature, the second video signature and the second audio signature and for correlating the first video signature with the second video signature to provide a video delay and for further correlating the first audio signature with the second audio signature to provide an audio delay, the signature analysis unit for further comparing the audio delay with said video delay and for providing an indication of a lip sync Is the audio delay Is different from said video delay.

In one embodiment of the apparatus for providing an indication of a lip sync, the first signature extraction unit comprises a first audio signature extraction unit for receiving the first audio signal and for providing the first audio signature signal and the first signature extraction unit comprises a first video signature extraction unit for receiving the first video signal and for providing the first video signature signal.

In yet another embodiment of the apparatus for providing an indication of a lip sync, the second signature extraction unit comprises a second audio signature extraction unit for receiving the second audio signal and for providing the second audio signature signal and the second signature extraction unit comprises a second video signature unit for receiving the second video signal and for providing the second video signature signal.

In yet another embodiment of the apparatus for providing an indication of a lip sync, the first audio signature extraction unit comprises a first filtering unit for receiving the first audio signal and for providing a first filtered signal, a second filtering unit for receiving the first audio signal and for providing a second filtered signal, a comparator for receiving the first filtered signal and the second filtered signal and for performing a comparison of the first filtered with the second filtered signal and for providing a comparison result to thereby provide the first audio signature signal.

In yet another embodiment of the apparatus for providing an indication of a lip sync, the first video signature extraction unit comprises a first image pixel data providing unit for receiving the first video signal and for providing a corresponding pixel data $P_k$ of a pixel k of a plurality of given pixels 1 to N of a first image of the first video signal; a second image pixel data providing unit for receiving the first video signal and for providing a corresponding pixel data $C_k$ of the corresponding given pixel k in a second image of the first video signal; a comparator for receiving the corresponding pixel data $P_k$ and the corresponding pixel data $C_k$ and for comparing the corresponding pixel data $P_k$ with the corresponding pixel data $C_k$ to provide a result signal indicative of the comparison; a counter for receiving and counting the result signal of each of the plurality of given pixels 1 to N and for providing a counter signal; and a video signature providing unit for receiving the counter signal and for providing the first video signature signal.

In yet another embodiment of the apparatus for providing an Indication of a lip sync, the second audio signature extraction unit comprises a first filtering unit for receiving the second audio signal and for providing a first filtered signal; a second filtering unit for receiving the second audio signal and for providing a second filtered signal; a comparator for receiving the first filtered signal and the second filtered signal and for performing a comparison of the first filtered with the second filtered signal and for providing a comparison result to thereby provide the second audio signature signal.

In yet another embodiment of the apparatus for providing an indication of a lip sync, the second video signature extraction unit comprises a first image pixel data providing unit for receiving the second video signal and for providing a corresponding pixel data $P_k$ of a pixel k of a plurality of given pixels 1 to N of a first image of the second video signal; a second image pixel data providing unit for receiving the second video signal and for providing a corresponding pixel data $C_k$ of the corresponding given pixel k in a second image of the second video signal; a comparator for receiving the corresponding pixel data $P_k$ and the corresponding pixel data $C_k$ and for comparing the corresponding pixel data $P_k$ with the corresponding pixel data $C_k$ to provide a result signal indicative of the comparison; a counter for receiving and counting the result signal of each of the plurality of given pixels 1 to N and for providing a counter signal and a video signature providing unit for receiving the counter signal and for providing the second video signature signal.

Another advantage of the embodiment disclosed is that it may be used for content comparison instead of lip sync detection.

Alternatively, the embodiment disclosed may be used for detecting pirated copies or for checking that a given ads has been properly inserted in a video signal. This may be done by comparing the video signal carrying the ads and the ads per se.

BRIEF DESCRIPTION OF THE DRAWINGS

In order that the invention may be readily understood, embodiments of the invention are Illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
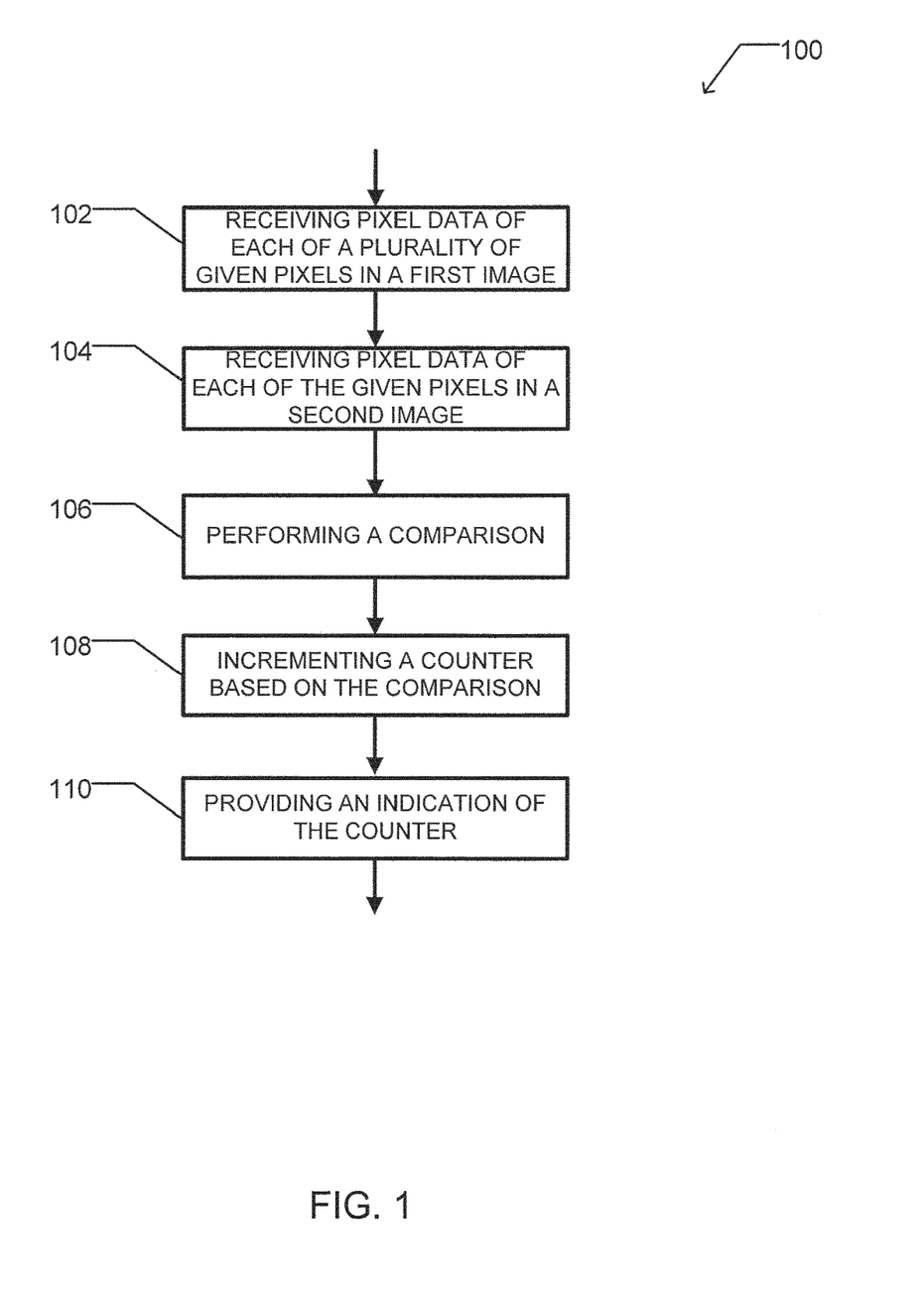
FIG. 1 is a flowchart which shows an embodiment of a method for generating a signature representative of a content of a video signal.

Now referring to FIG. 1, there is shown an embodiment of a method for generating a video signature representative of a content of a video signal. It will be appreciated that generating a video signature representative of a content of a video signal may be of great advantage for various reasons as further explained herein below.

According to processing step 102, pixel data of each of a plurality of given pixels In a first image are received.

It will be appreciated that in one embodiment, the image originates from a digital video stream. Alternatively, the image may originate from an analog video stream. In other embodiments, the image may originate from a file-based source.

The skilled addressee will appreciate that the given pixels are pixels that may be selected in the image according to various criteria. For instance, the given pixels may be selected according to spatial criteria. For instance, It has been contemplated that some parts of an Image may be of less interest for the purpose of generating a signature.

This may be the case for instance for parts of an image where no significant changes occur. Alternatively, it may be the case for parts of an image resulting from a format conversion. Alternatively, those parts of an image may be pads of images that have been modified for branding reasons.

In one embodiment a windowing may be accordingly performed on a part of interest of an image in order to remove those parts of the image that have a limited interest.

In a preferred embodiment, the given pixels are pixels each separated from one another by a given amount of pixels. The amount of given pixels does not change when the resolution of the video signal changes in the preferred embodiment. Alternatively, the amount of given pixels changes when the resolution of the video signal changes.

According to processing step 104, pixel data of each of a plurality of given pixels in a second image are received.

It will be appreciated that the second image is an image following in time the first image in the video signal.

In a preferred embodiment, the second image is immediately following the first image in the video signal.

According to processing step 106, a comparison is performed.

In one embodiment, the comparison is performed for each given pixel of the plurality of given pixels.

More precisely, corresponding pixel data of the given pixel of the first image is compared with the corresponding pixel data of the given pixel in the second image in order to provide a corresponding indication of a difference between the pixel data of the given pixels of the first image and the pixel data of the given pixel in the second image.

In one embodiment, the comparison is a subtraction of the pixel data of the given pixel of the first image with corresponding pixel data of the given pixel of the second image. The comparison is performed for each given pixel of the plurality of given pixels.

Alternatively the comparison may be a combination of operations involving the pixel data of each of the given pixels of the first image with corresponding pixel data of each of the given pixels of the second image.

According to processing step 108, a counter value is incremented based on the result of the comparison.

In one embodiment, the counter value is incremented in the case where the result of the operation is greater than a given threshold value.

The skilled addressee will appreciate that various embodiments of the given threshold value may he provided. In a preferred embodiment, the threshold value is equal to thirty two (32) on an 8 bit precision video pixel.

Moreover, it will be appreciated that the given threshold value may be provided according to various criteria such as a type of video signal.

According to processing step 110, an indication of the counter value is provided. The indication of the counter value is used as the video signature representative of a content of the video signal.

It will be appreciated that in one embodiment, the processing step of providing the indication of a counter value may comprise normalizing the counter value to provide a counter value limited by a given value.

In a preferred embodiment, a normalizing of the counter value is performed by dividing the counter value by (N/15) where N is the number of given pixels.

The skilled addressee will appreciate that the method disclosed for providing a video signature representative of a content of the video signal is of great advantage for various reasons.

An advantage of the method disclosed is that such method may be used for providing information, i.e. a signature, for characterizing the content of the video signal. When signatures are used for characterizing each of two video signals, those signatures may be advantageously correlated and in turn be used for detecting a delay between the two video signals which is of great advantage.

Another advantage of the method disclosed is that it requires limited processing resources for generating the signature which is therefore of great advantages. Such method does not require any complex algorithm for analyzing the content of the video signal.

Another advantage of the method is that its implementation requires limited storing resources.

Figure 2:
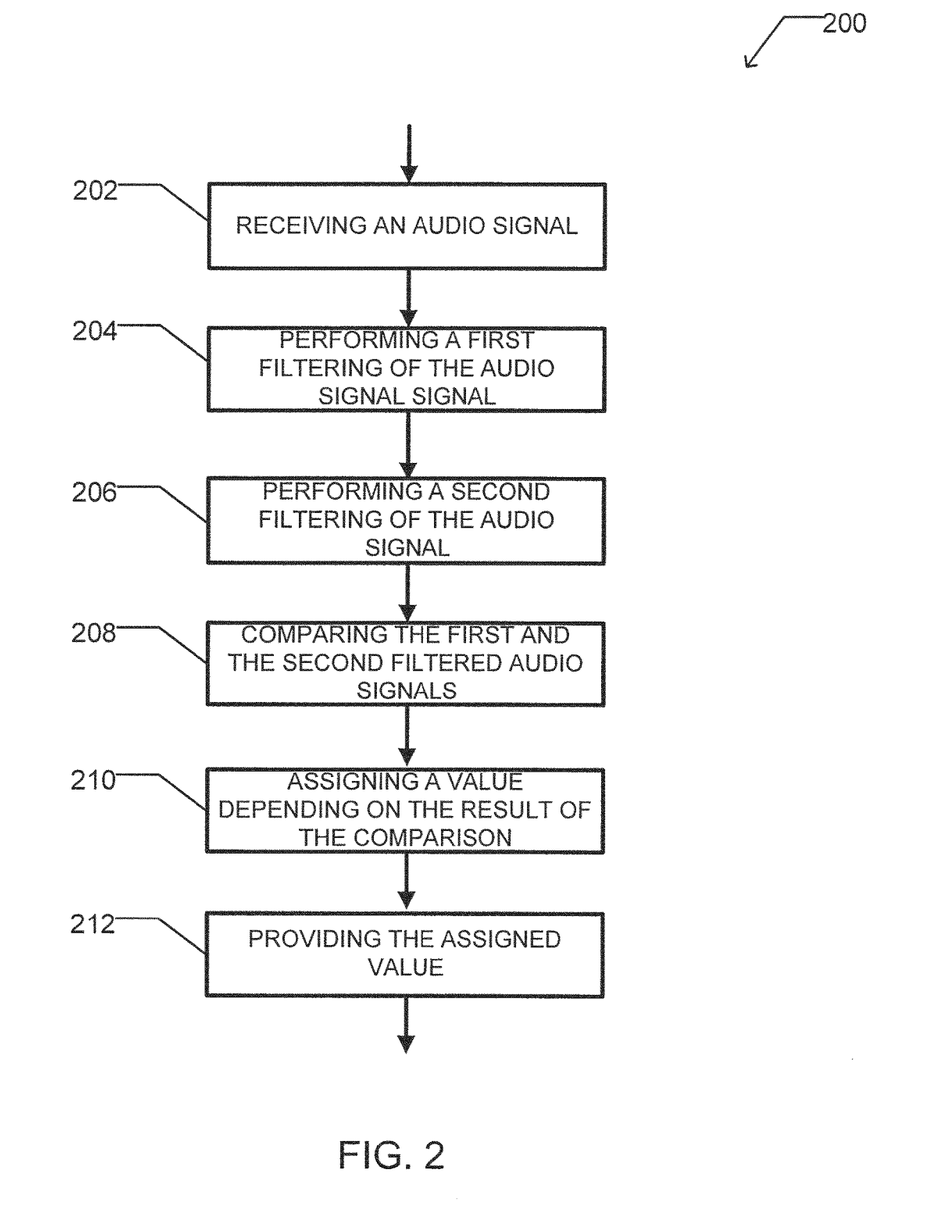
FIG. 2 is a flowchart which shows an embodiment of a method for generating a signature representative of a content of an audio signal.

Now referring to FIG. 2, there is shown an embodiment of a method for generating an audio signature representative of a content of an audio signal. If will be appreciated that generating an audio signature representative of a content of an audio signal may be of great advantage for various reasons as further explained below.

According to processing step 202, an audio signal is received. It will be appreciated that the audio signal may be received from various sources. For instance, the audio signal may be receiving from an audio stream. Alternatively, the audio signal may be received from a file. It will further be appreciated that the audio signal may he imbedded in a video stream.

Moreover, it will be appreciated that the audio signal may be provided in various forms such as in a digital format or in an analog format. Moreover it will he appreciated that the audio signal may be formatted according to various standards known to the skilled addressee.

According to processing step 204, a first filtering of the received audio signal is performed.

In one embodiment, the first filtering of the received audio signal comprises detecting an envelope of the audio signal.

According to processing step 206, a second filtering of the received audio signal is performed.

In one embodiment, the second filtering of the received audio signal comprises computing an average value of the received audio signal.

It will be appreciated by the skilled addressee that processing steps 204 and 206 may be performed in parallel. Alternatively, processing steps 204 and 206 may be performed serially.

According to processing step 208, the first filtered audio signal is compared to the second filtered audio signal.

It will be appreciated that the comparison may be a combination of operations involving the first filtered audio signal and the second filtered audio signal.

In a preferred embodiment, the comparison comprises checking If the first filtered audio signal is greater than the second filtered audio signal.

According to processing step 210, a value is assigned depending on the result of the comparison. It will be appreciated that the value may be any type of value.

In a preferred embodiment, the value is a binary value. Still in a preferred embodiment, binary value one (1) is assigned if the first filtered audio signal is greater than the second filtered audio signal while binary value zero (0) is assigned if the second filtered audio signal is greater or equal than the first filtered audio signal.

According to processing step 212, the assigned value is provided. It will be appreciated that the assigned value. The assigned value is used as the audio signature representative of a content of the audio signal.

It will be appreciated that in a preferred embodiment the providing of the assigned value may comprise a decimation processing step. The skilled addressee will appreciate that the purpose of the decimation processing step is to remove a given amount of unwanted/redundant data. The skilled addressee will also appreciate that this will further result in a signature having a shorter size which is also of great advantage.

The skilled addressee will appreciate that the method disclosed for providing an audio signature representative of a content of the audio signal is of great advantage for various reasons.

An advantage of the method disclosed is that such method may be used for providing information, i.e. a signature, for characterizing the content of the audio signal. When signatures are used for characterizing each of two audio signals, those two signatures may be advantageously correlated and in turn be used for detecting a delay between the two audio signals which is of great advantage.

Another advantage of the method disclosed above is that they require limited processing resources for generating the signature which is of great advantage.

A further advantage is that the implementation of the method disclosed may require limited memory resource which is also of great advantage.

Figure 3A:
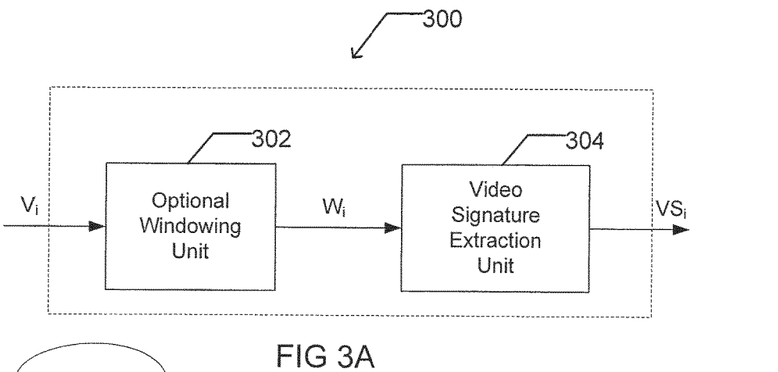
FIG. 3A is a block diagram which shows an embodiment of an apparatus for generating a video signature representative of a content of a video signal.

Now referring to FIG. 3a, there is shown an embodiment of an apparatus 300 for providing a video signature.

The apparatus 300 for providing a video signature comprises an optional windowing unit 302 and a video signature extraction unit 304.

More precisely, the optional windowing unit 302 is used for performing a windowing of an incoming image signal $V_i$. The optional windowing unit 302 provides a corresponding selected signal $W_i$. The skilled addressee will appreciate that the optional windowing unit 302 may be implemented according to various embodiments known to the skilled addressee.

The apparatus 300 for providing a video signature further comprises the video signature extraction unit 304.

The video signature extraction unit 304 is used for extracting a video signature from an incoming video signal. In this embodiment, the video signature extraction unit 304 receives the selected signal $W_i$ provided by the optional windowing unit 302 and provides a video signature signal $VS_i$.

Figure 3B:
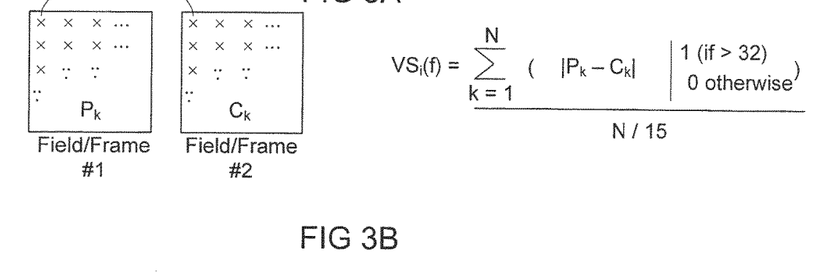
FIG. 3B is a schematic which shows how the video signature representative of a content of a video signal is generated according to one embodiment.

Now referring to FIG. 3B, there is shown an embodiment which shows how the video signature extraction unit 304 operates according to an embodiment.

In accordance with this embodiment, a corresponding pixel data $P_k$ of a pixel k of a plurality of given pixels 1 to N of a first image is compared with a corresponding pixel data $C_k$ of the corresponding given pixel k in a second image in order to provide a corresponding indication of a difference $|P_k-C_k|$ between the pixel data of the given pixel of the first image and the pixel data of the given pixel in the second image.

An absolute value of the result $|P_k-C_k|$, of the comparison is taken. In the case where the absolute value of the result is larger than a given threshold value, binary value one (1) is assigned. If this is not the case, binary value zero (0) is assigned. Such operation is performed for each pixel of the plurality of given pixels.

Moreover, an optional normalization of the result may be performed. The video signature signal may be therefore defined as:

$$VS_i(f) = \frac{\sum_{k=1}^{N} \left( |P_k - C_k| \begin{vmatrix} 1 \text{ if} > 32 \\ 0 \text{ otherwise} \end{vmatrix} \right)}{N/15}$$

The skilled addressee will appreciate that various other alternative embodiments may be provided.

Figure 3C:
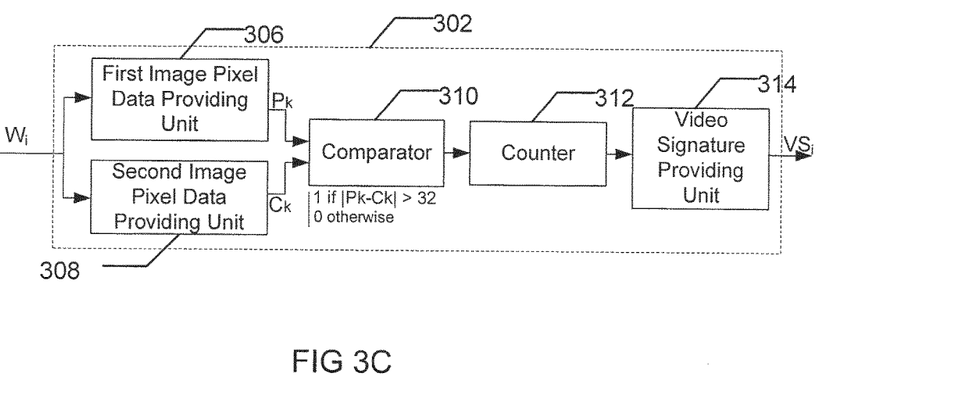
FIG. 3C is a block diagram which shows an embodiment of a video signature extraction unit.

Now referring to FIG. 3C, there is shown an embodiment of the video signature extraction unit 304.

The video signature extraction unit 304 comprises a first image pixel data providing unit 306, a second image pixel data providing unit 308, a comparator 310, a counter 312 and a video signature providing unit 314.

The first image pixel data providing unit 306 is used for receiving the selected signal $W_i$ provided by the optional windowing unit 302 and for providing a corresponding pixel data $P_k$ of a pixel k of a plurality of given pixels 1 to N of the first image.

Similarly, the second image pixel data providing unit 308 is used for receiving the selected signal $W_i$ provided by the optional windowing unit 302 and for providing a corresponding pixel data $C_k$ of the corresponding given pixel k in the second image.

The comparator 310 is used for receiving the corresponding pixel data $P_k$ of a pixel k of a plurality of given pixels 1 to N of the first image and the corresponding pixel data $C_k$ of the corresponding given pixel k in the second image and for comparing the corresponding pixel data $P_k$ with the corresponding pixel data $C_k$.

In one embodiment the comparator 310 outputs a logic value one (1) if $|P_k-C_k|$ is greater than thirty two (32) and a logic value zero (0) otherwise.

The counter 312 receives the output from the comparator 310 and provides a signal indicative of a number of logic value ones received by the counter 312.

The video signature providing unit 314 receives the signal indicative of a number of logic value ones received by the counter 312 and provides the video signature signal $VS_i$. In one embodiment, the video signature providing unit 314 performs a division of the signal indicative of a number of logic value ones received by the counter 312 by N/15 wherein N is the number of given pixels.

Figure 4A:
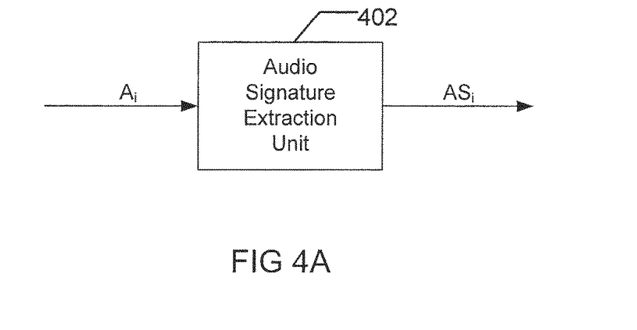
FIG. 4A is a block diagram which shows an embodiment of an apparatus for generating an audio signature representative of a content of an audio signal.

Now referring to FIG. 4A, there is shown an embodiment of an apparatus 402 for generating an audio signature representative of a content of an audio signal.

In this embodiments the apparatus 402 for generating an audio signature representative of a content of an audio signal receives an audio signal $A_i$ and provides a corresponding audio signature signal $AS_i$.

It will be appreciated that the audio signal $A_i$ may be of various forms such as in a digital format or in an analog format. Moreover if will be appreciated that the audio signal may be formatted according to various standards as already explained above.

Similarly, it will be appreciated that the corresponding audio signature signal $AS_i$ may be of various forms such as in a digital format or in an analog format. Moreover it will be appreciated that the corresponding audio signature signal $AS_i$ may be formatted according to various standards as explained above.

Figure 4B:
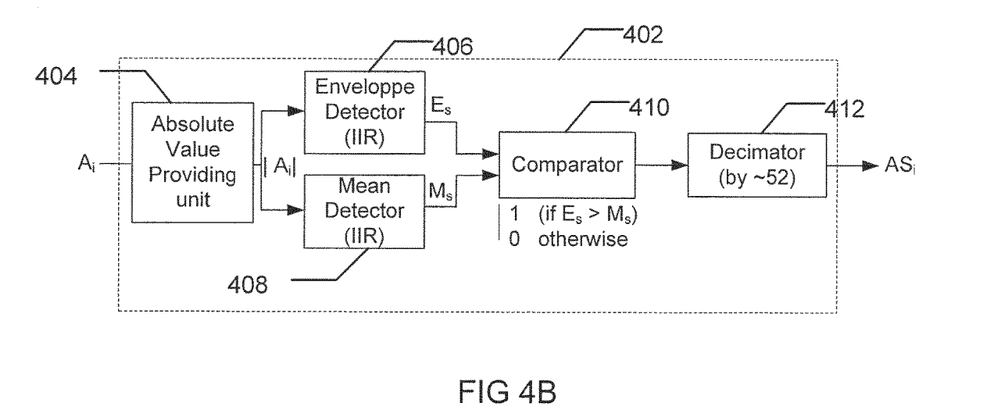
FIG. 4B is a block diagram which shows an embodiment of an apparatus for generating an audio signature representative of a content of an audio signal; in this embodiment, the apparatus for generating an audio signature representative of a content of an audio signal comprises, inter alia, an envelope detector, a mean detector and a comparator.

Now referring to FIG. 4B, there is shown an embodiment of the apparatus 402 for generating an audio signature representative of a content of an audio signal.

In this embodiment, the apparatus 402 for generating an audio signature representative of a content of an audio signal comprises an absolute value providing unit 404, an envelope detector 406, a mean detector 408, a comparator 410 and a decimator 412.

The absolute value providing unit 404 is used to provide a signal indicative of an absolute value of the audio signal $A_i$.

The envelope detector 408 is used to provide a signal $E_s$ indicative of an envelope of the signal indicative of an absolute value of the value of the audio signal $A_i$. It will be appreciated that the envelope detector 406 is an embodiment of a first filtering unit.

Moreover, it will be appreciated that the envelope detector 406 may be implemented in various ways as known by the skilled addressee.

In a preferred embodiment, the envelope detector 406 is implemented using a one-tap Infinite Impulse Response (IIR) filter.

The mean detector 408 is used to provide a signal $M_s$ indicative of a mean of the signal indicative of an absolute value of the value of the audio signal $A_i$. It will be appreciated that the mean detector 408 is an embodiment of a second filtering unit.

Moreover, if will be appreciated that the mean detector 408 may be implemented in various ways as known by the skilled addressee.

In a preferred embodiment, the mean detector 408 is implemented using a one-tap Infinite Impulse Response (IIR) filter.

The comparator 410 is used for making a comparison between two incoming signals. More precisely, the comparator 410 receives the signal $M_s$ indicative of a mean of the signal indicative of an absolute value of the value of the audio signal $A_i$ and the signal $E_s$ indicative of an envelope of the signal indicative of an absolute value of the value of the audio signal $A_i$ and performs a comparison between those two signals.

If the signal $E_s$ indicative of an envelope of the signal indicative of an absolute value of the value of the audio signal $A_i$ is greater than the signal $M_s$ indicative of a mean of the signal indicative of an absolute value of the value of the audio signal $A_i$, a one (1) logic value signal is outputted by the comparator 410. Otherwise a zero (0) logic value signal is outputted by the comparator 410.

The skilled addressee will appreciate that various other types of comparison may he made.

Moreover, it will be appreciated that the comparator 410 may be implemented in various ways.

The declinator 412 is used for performing decimation on a signal provided by the comparator 410. The decimator 412 provides the audio signature signal $AS_i$.

It will be appreciated that the decimator 412 is optional.

Moreover, it will be appreciated that the decimator 412 may be implemented in various ways as known by the skilled addressee. In one embodiment, a decimation by fifty two (52) is performed by the decimator 412.

In a preferred embodiment, the decimator 412 takes a sample and ignores fifty one (51) following samples. Alternatively, the sample is taken every one (1) ms. Other methods may alternatively be used. For instance, those methods may take into consideration the value of each sample for selecting a given sample.

Figure 5:
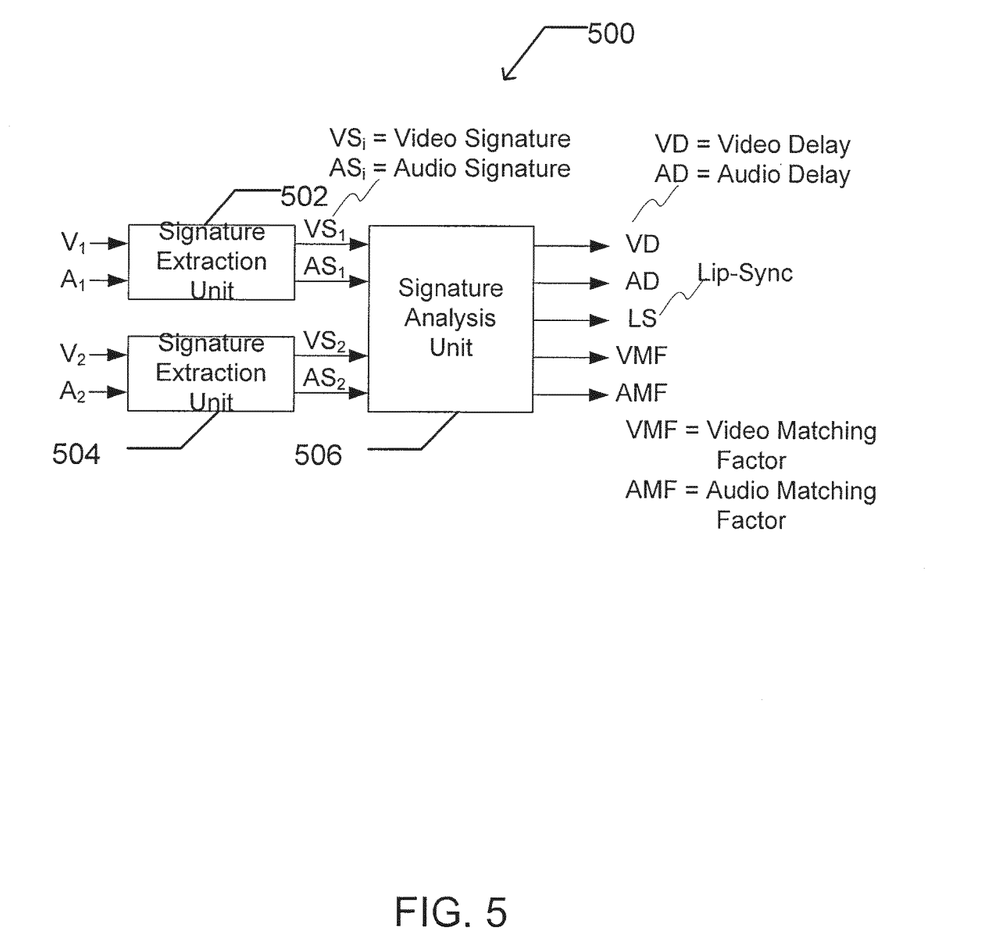
FIG. 5 is a block diagram of an embodiment of an apparatus comprising an audio signal signature extraction unit, a video signal signature extraction unit and a signature analysis unit for providing, inter alia, an indication of a lip sync.

How referring to FIG. 5, there is shown an embodiment of an apparatus 500 which uses an audio signal signature extraction unit and a video signal signature extraction unit for providing, inter alia, an indication of a lip sync.

In this embodiment, a first audio/video content is to be compared to a second audio/video content.

More precisely, the first audio/video content comprises a first audio signal and a first video signal while the second audio/video content comprises a second audio signal an a second video signal.

As shown below, by carefully comparing the signatures of the first audio/video content with the signatures of the second audio/video content it is possible to provide an indication of a lip sync, i.e. to providing an indication of a desynchronization that occurred between the video signal and its corresponding audio signal. As known by the skilled addressee, such desynchronization may occur for various reasons such as for instance for reasons associated with the transmission of the signals over a medium.

More precisely and as shown in FIG. 5, the apparatus 500 comprises a first signature extraction unit 502, a second signature extraction unit 504 and a signature analysis unit 506.

The first signature extraction unit 502 is used for providing a first video signature signal $VS_1$ and a first audio signature signal $AS_1$ of respectively a first video signal $V_1$ and a first audio signal $A_1$ associated with the first video signal $V_1$.

The first signature extraction unit 502 comprises, as not shown in FIG. 5, an audio signature extraction unit and a video signature extraction unit each responsible for respectively receiving the first audio signal $A_1$ and providing the first audio signature signal $AS_1$ and receiving the first video signal $V_1$ and providing the first video signature signal $VS_1$. Such video signature extraction unit and audio signature extraction unit have been already described above.

The second signature extraction unit 504 is used for providing a second video signature signal $VS_2$ and a second audio signature signal $AS_2$ of respectively a second video signal $V_2$ and a second audio signal $A_2$ associated with the second video signal $V_2$.

The second signature extraction unit 504 comprises, as not shown in FIG. 5, an audio signature extraction unit and a video signature extraction unit each responsible for respectively receiving the second audio signal $A_2$ and providing the second audio signature signal $AS_2$ and receiving the second video signal $V_2$ and providing the second video signature signal $VS_2$. Such video signature extraction unit and audio signature extraction unit have also been already described above.

The signature analysis unit 506 is used for receiving the first video signature signal $VS_1$, the first audio signature signal $AS_1$, the second video signature signal $VS_2$ and the second audio signature signal $AS_2$.

The signature analysis unit 506 provides a signal VD indicative of a video delay, a signal AD indicative of an audio delay, a signal LS Indicative of a lip sync, a signal VMF indicative of a video matching factor and a signal AMF indicative of an audio matching factor.

The signal VD indicative of a video delay is generated by comparing the first video signature signal $VS_1$ with the second video signature signal $VS_2$ and by determining a delay between those two signals as shown further below.

Similarly, the signal AD indicative of an audio delay is generated by comparing the first audio signature signal $AS_1$ with the second audio signature signal $AS_2$ and by determining a delay between those two signals as shown further below.

The signal VMF indicative of a video matching factor and the signal AMF indicative of an audio matching factor are generated as further explained below.

Finally and in one embodiment, the signal LS indicative of a lip sync is generated by comparing the signal VD indicative of a video delay with the signal AD indicative of an audio delay.

In the implementation described herein the signal VMF indicative of a video matching factor and the signal AMF indicative of an audio matching factor are further used for generating the signal LS indicative of a lip sync.

While the embodiment disclosed in FIG. 5 has been shown to be used for lip sync defection, the skilled addressee will appreciate that such embodiment may be advantageously used for content comparison for instance.

Alternatively, the embodiment may be used for detecting pirated copies. In an alternative embodiment, the method disclosed may be used for checking that a given ads has been properly inserted in a video signal. This may be done by comparing the signatures of the audio/video signal carrying the ads and the signatures of the ads per se.

Figure 6:
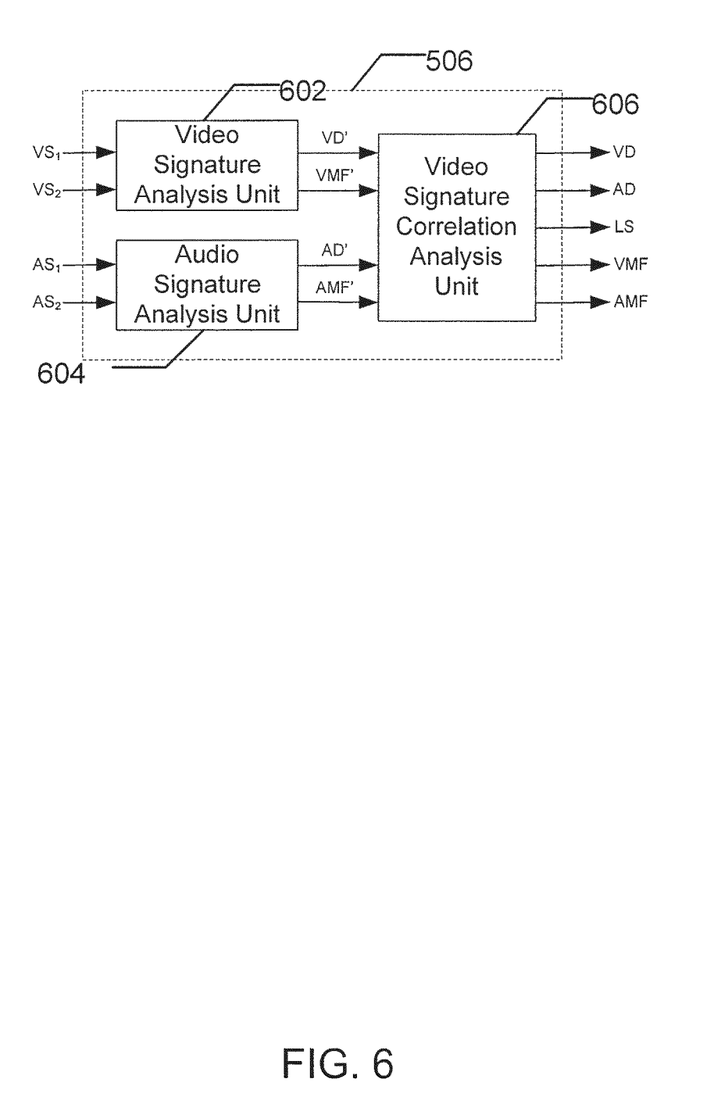
FIG. 6 is a block diagram which shows an embodiment of the signature analysis unit disclosed in FIG. 5.

Now referring to FIG. 6, there is shown an embodiment of the signature analysis unit 506 disclosed in FIG. 5.

The signature analysis unit 506 comprises a video signature analysis unit 602, an audio signature analysis unit 604 and a video signature correlation analysis unit 606.

The video signature analysis unit 602 is used for determining an estimation VD' of the signal indicative of a video delay between the first video signature signal $VS_1$ and the second video signature signal $VS_2$.

The video signature analysis unit 602 is further used for determining an estimation VMF' of a signal indicative of a video matching factor.

Similarly, the audio signature analysis unit 604 is used for determining an estimation AD' of the signal indicative of an audio delay between the first audio signature signal $AS_1$ and the second audio signature signal $AS_2$.

The audio signature analysis unit 604 is further used for determining an estimation AMF' of a signal indicative of an audio matching factor.

The video signature correlation analysis unit 606 receives the estimation VD' of the signal indicative of a video delay between the first video signature signal $VS_1$ and the second video signature signal $VS_2$, the estimation AD' of the signal indicative of an audio delay between the first audio signature signal $AS_1$ and the second audio signature signal $AS_2$, the estimation VMF' of a signal indicative of a video matching factor and the estimation AMF' of a signal indicative of an audio matching factor.

The video signature correlation analysis unit 606 provides the signal LS indicative of a lip sync, the signal VD indicative of a video delay, the signal AD indicative of an audio delay, the signal VMF indicative of a video matching factor and the signal AMF indicative of an audio matching factor.

In one embodiment, the signal LS indicative of a lip sync is defined as LS=(VD'-AD') if VMF'≥threshold1 & AMF'≥threshold2, wherein threshold1 and threshold2 are given values. In one embodiment, the threshold1 is equal to 50% while the threshold2 is equal to 40%. The skilled addressee will appreciate that various other values may be used.

The skilled addressee will appreciate that the signal VD indicative of a video delay and the signal AD indicative of an audio delay are generated using respectively at least the estimation VD' of the signal indicative of a video delay between the first video signature signal $VS_1$ and the second video signature signal $VS_2$ and the estimation AD' of the signal indicative of an audio delay between the first audio signature signal $AS_1$ and the second audio signature signal $AS_2$. In fact, the skilled addressee will appreciate that estimations are first computed prior to provide the values for the sake validating the values.

Figure 7A:
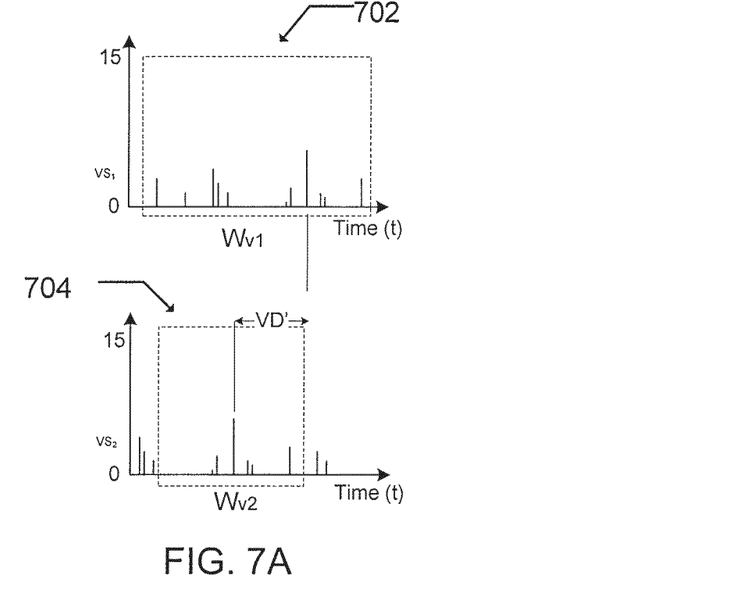
FIG. 7A is a schematic which shows an embodiment of two streams of video signature signals delayed in time.

Now referring to FIG. 7A, there are shown a graph 702 showing an example of the first video signature signal $VS_1$ and a graph 704 showing an example of the second video signature signal $VS_2$.

It will be appreciated that the first video signature signal $VS_1$ and the second video signature signal $VS_2$ are desynchronized in time by an amount of time corresponding to the estimation VD' of the signal indicative of a video delay between the first video signature signal $VS_1$ and the second video signature signal $VS_2$. Still in this embodiment, the first video signature signal $VS_1$ is delayed in time compared to the second video signature signal $VS_2$.

Figure 7B:
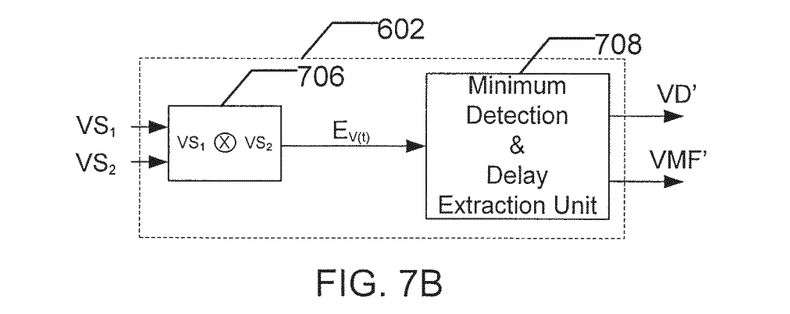
FIG. 7B is a block diagram which shows an embodiment of a video signature analysis unit used for analyzing two video signature signals.

Now referring to FIG. 7B, there is shown an embodiment of the video signature analysis unit 602.

The video signature analysis unit 602 comprises a convolution unit 706 and a minimum defection and delay extraction unit 708.

The convolution unit 706 is used for performing a convolution of the first video signature signal $VS_1$ and the second video signature signal $VS_2$. In one embodiment the convolution is a time shifted convolution of the second video signature signal $VS_2$ window across the first video signature signal $VS_1$ window.

In one embodiment the second video signature signal $VS_2$ window has a value of twenty (20) seconds while the first video signature signal $VS_1$ window has a value of thirty (30) seconds.

The convolution unit 706 provides a convolution signal $E_V(t)$.

It will be appreciated by the skilled addressee that the convolution may be alternatively performed in various other ways. Moreover it will be appreciated that the convolution unit 706 may implemented in various way.

The minimum defection and delay extraction unit 708 is used for detecting a minimum in the convolution signal $E_V(t)$. It will be appreciated that the minimum in the convolution signal $E_V(t)$ is indicative of the estimation VD' of the signal indicative of a video delay between the first video signature signal $VS_1$ and the second video signature signal $VS_2$.

The minimum defection and delay extraction unit 708 is further used for providing the estimation VMF' of a signal indicative of a video matching factor.

It will be appreciated that the signal VMF indicative of a video matching factor is indicative of a level of similarity measured in the video signatures.

It will be appreciated that the signal estimation VMF' of a signal indicative of a video matching factor is a function of the convolution signal $E_V(t)$ and the estimation VD' of the signal indicative of a video delay between the first video signature signal $VS_1$ and the second video signature signal $VS_2$.

Figure 7C:
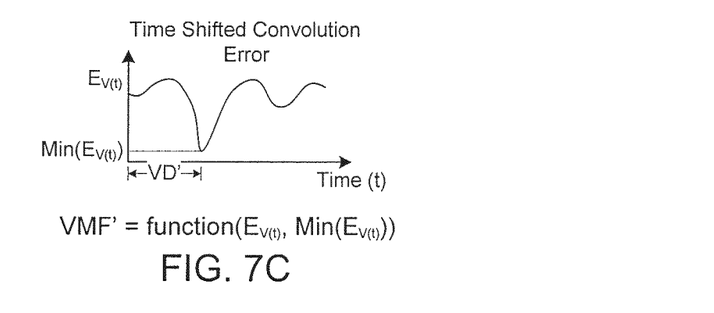
FIG. 7C is a graph which shows an embodiment of a variation of the result of the convolution of a first video signature signal with a second video signature signal.

In a preferred embodiment, the signal estimation VMF' of a signal indicative of a video matching factor is defined as VMF'=100*(1-(Min($E_V(t)$))/Sum($VS_2$)), wherein VMF' is the estimated video matching factor between the first video signature signal $VS_1$ and the second video signature signal $VS_2$ and is expressed in percentage, Min($E_V(t)$) is the minimum error found in the video correlation graph disclosed at FIG. 7c., and Sum($VS_2$) is the sum of the signature vector in the window $W_{V2}$. It will be appreciated that in that embodiment, when $V_1$ and $V_2$ are exactly the same, VMF' is equal to 100% while if one of the two video sources is altered, VMF' will be reduced. In this embodiment, under 50%, the video sources are considered to be different.

If will be appreciated that the minimum detection and delay extraction unit 708 may be implemented in various ways.

Figure 8A:
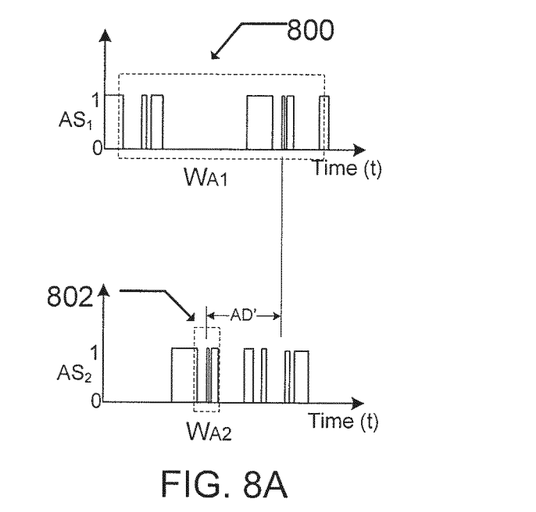
FIG. 8A is a schematic which shows an embodiment of two streams of audio signature signals delayed in time.

Now referring to FIG. 8, there are shown a graph 800 showing an example of the first audio signature signal $AS_1$ and a graph 802 showing an example of the second audio signature signal $AS_2$.

It will be appreciated that the first audio signature signal $AS_1$ and the second audio signature signal $AS_2$ are desynchronized in time by an amount of time corresponding to the estimation AD' of the signal indicative of an audio delay between the first audio signature signal $AS_1$ and the second audio signature signal $AS_2$. Still in this embodiment, the first audio signature signal $AS_1$ is delayed in time compared to the second audio signature signal $AS_2$.

Figure 8B:
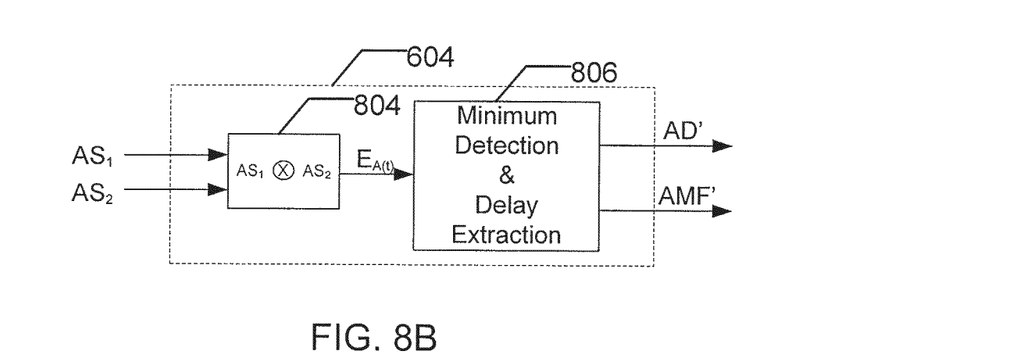
FIG. 8B is a block diagram which shows an embodiment of an audio signature analysis unit used for analyzing two audio signature signals.

Now referring to FIG. 8B, there is shown an embodiment of audio signature analysis unit 604 for determining the estimation AD' of the signal indicative of an audio delay between the first audio signature signal $AS_1$ and the second audio signature signal $AS_2$ and the estimation AMF' of a signal indicative of an audio matching factor.

The audio signature analysis unit 604 comprises a convolution unit 804 and a minimum detection and delay extraction unit 806.

The convolution unit 804 is used for performing a convolution of the first audio signature signal $AS_1$ and the second audio signature signal $AS_2$. In one embodiment the convolution is a time shifted convolution of the second audio signature signal $AS_2$ window across the first audio signature signal $AS_1$ window.

In one embodiment, the second audio signature signal $AS_2$ window has a value of one (1) second while the first audio signature signal $AS_1$ window has a value of ten (10) seconds. It will be appreciated that those values may be changed depending on various needs.

The convolution unit 804 provides a convolution signal $E_A(t)$.

It will be appreciated by the skilled addressee that the convolution may be alternatively performed in various other ways. Moreover if will be appreciated that the convolution unit 804 may implemented in various ways.

The minimum detection and delay extraction unit 806 is used for detecting a minimum in the convolution signal $E_A(t)$. It will be appreciated that the minimum in the convolution signal $E_A(t)$ is indicative of the estimation AD' of the signal indicative of an audio delay between the first audio signature signal $AS_1$ and the second audio signature signal $AS_2$.

The minimum detection and delay extraction unit 806 is further used for providing the signal estimation AMF' of a signal indicative of an audio matching factor.

It will be appreciated that the signal estimation AMF' of a signal indicative of an audio matching factor is indicative of a level of similarity measured in the audio signatures.

It will be appreciated that the signal estimation AMF' of a signal indicative of an audio matching factor is a function of the convolution signal $E_A(t)$ and the estimation AD' of the signal indicative of an audio delay between the first audio signature signal $AS_1$ and the second audio signature signal $AS_2$.

Figure 8C:
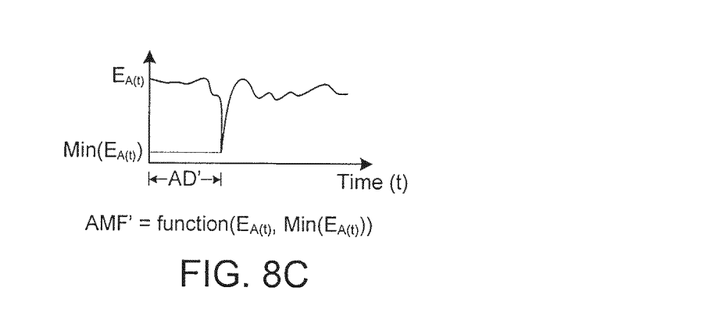
FIG. 8C is a graph which shows an embodiment of a variation of the result of the convolution of a first audio signature signal with a second audio signature signal.

In a preferred embodiment, the signal estimation AMF' of a signal Indicative of an audio matching factor is defined as:
$AMF'=100*(1-Min((E_A(t))/(Size(AS_2)/5))$, wherein AMF' is the estimated audio matching factor between the first audio signature signal $AS_1$ and the second audio signature signal $AS_2$ expressed in percentage, $Min((E_A(t))$ is the minimum error found in the audio correlation graph shown in FIG. 8c and $Size(AS_2)$ is the size of the audio signature vector in the window $W_{A2}$. It will he appreciated that when $A_1$ and $A_2$ are exactly the same, the signal estimation AMF' of a signal indicative of an audio matching factor is equal to 100%. If one of the two audio sources was altered, the signal estimation AMF' of a signal indicative of an audio matching factor will be reduced. Still in this embodiment, when the signal estimation AMF' of a signal indicative of an audio matching factor is under 40%, the audio sources are considered to be different.

It Will be appreciated that the minimum detection and delay extraction unit 806 may be implemented in various ways. For instance, the minimum detection and delay extraction unit 806 may first perform a pre-scan in order to select a first selection of convoluted samples. In one embodiment the first selection represents one-eight (⅛) of all the convoluted samples. A search may then be performed in the selected convoluted samples.

Although the above description relates to a specific preferred embodiment as presently contemplated by the inventor, it will he understood that the invention in its broad aspect includes mechanical and functional equivalents of the elements described herein.

The invention claimed is:

1. A method for setting a signal delay based on generated video signatures representative of a content of a video signal, the method comprising:
for each of a first video signal and second video signal comprising the first signal after at least one transmission operation:
selecting, by a signature extraction unit, a first subset of pixels of a first image of the video signal and a corresponding second subset of pixels of a second image of the video signal, each of the first subset and second subset excluding one or more pixels of the corresponding image,
incrementing, by a comparator of the signature extraction unit for each pixel of the first subset of pixels, a counter value responsive to a difference between pixel data of a pixel of the first subset of pixels and pixel data of a corresponding pixel of the second subset of pixels exceeding a threshold,
dividing, by the signature extraction unit, the counter value by a value proportional to the number of the plurality of pixels, and
generating, by the signature extraction unit, a video signature comprising the divided counter value;
identifying a delay between the first video signal and second video signal based on a comparison of the video signature of the first video signal and the video signature of the second video signal; and
automatically setting a signal delay based on the identified delay.

2. The method of claim 1, wherein incrementing the counter further comprises selecting the first image and the second image from a window of the video signal.

3. A video signature analyzer for setting a signal delay based on generated video signature signals representative of a content of a video signal, comprising:
a video signature extraction unit comprising:
a counter,
a windowing unit configured to receive a video signal and select a first image and a second image from a window of the video signal,
a first image pixel data providing unit configured to select a subset of pixels of the first image,
a second image pixel data providing unit configured to select a corresponding subset of pixels of the second image,
a comparator configured to, for each pixel of the subset of pixels, increment a value of the counter responsive to a difference between pixel data of a pixel of the first image and pixel data of a corresponding pixel of the second image exceeding a threshold, and a signature providing unit configured to divide the counter value by a value proportional to the number of the plurality of pixels, and generate a signature comprising the divided counter value; and a video signature analysis unit configured to:
receive, from the signature providing unit, a first signature representative of a first video signal and a second signature representative of the first video signal after at least one transmission operation,
identify a delay between the first video signal and second video signal based on a comparison of the first signature and the second signature; and
automatically set a video signal delay based on the identified delay.

4. A method for setting a signal delay based on generated audio signatures representative of a content of an audio signal, the method comprising:
for each of a first audio signal and a second audio signal comprising the first audio signal after at least one transmission operation:
filtering the audio signal via a first filter to generate a first filtered audio signal and via a second filter different from the first filter to generate a second filtered audio signal,
assigning a plurality of filtered audio comparison values responsive to a corresponding plurality of comparisons of the first filtered audio signal to the second filtered audio signal, the filtered audio comparison values comprising a first predetermined value responsive to the first filtered audio signal exceeding the second filtered audio signal, and comprising a second predetermined value responsive to the second filtered audio signal equaling or exceeding the first filtered audio signal, and
decimating the plurality of assigned filtered audio comparison values to generate an audio signature representative of the content of the audio signal;
identifying a delay between the first audio signal and second audio signal based on a comparison of the audio signature of the first audio signal and the audio signature of the second audio signal; and
automatically setting a signal delay based on the identified delay.

5. The method of claim 4, wherein filtering the audio signal to generate the first filtered audio signal comprises detecting an envelope signal of the audio signal.

6. The method of claim 4, wherein filtering the audio signal further comprises calculating an absolute value of the audio signal.

7. The method of claim 4, wherein decimating the plurality of assigned values further comprises removing a subset of the plurality of assigned values.

8. An audio signature analyzer for setting a signal delay based on generated audio signature signals representative of a content of an audio signal, the audio signature extraction unit comprising:
a first filter configured to filter an audio signal to generate a first filtered audio signal;
a second filter, different from the first filter, configured to filter the audio signal to generate a second filtered audio signal;
a comparator configured to assign a plurality of filtered audio comparison values responsive to a corresponding plurality of comparisons of the first filtered audio signal to the second filtered audio signal, the filtered audio comparison values comprising a first predetermined value responsive to the first filtered audio signal exceeding the second filtered audio signal, and comprising a second predetermined value responsive to the second filtered audio signal equaling or exceeding the first filtered audio signal;
a decimator configured to decimate the plurality of assigned filtered audio comparison values to generate an audio signature representative of the content of the audio signal; and
a signature analysis unit configured to:
receive, from the decimator, a first signature representative of a first audio signal and a second signature representative of the first audio signal after at least one transmission operation,
identify a delay between the first audio signal and second audio signal based on a comparison of the first signature and the second signature; and
automatically set an audio signal delay based on the identified delay.

9. The audio signature extraction unit of claim 8, wherein the first filter is further configured to detect an envelope signal of the audio signal.

10. The audio signature extraction unit of claim 8, further comprising a third filter configured to calculate an absolute value of the audio signal.

11. The audio signature extraction unit of claim 8, wherein the decimator is further configured to remove a subset of the plurality of assigned values.

12. A method for determining a delay in a signal induced through transmission operations, the method comprising:
for each of a first video signal and a second video signal comprising the first video signal after at least one transmission operation:
incrementing, by a comparator of one or more signature extraction units, a counter value responsive to a difference between pixel data of a first pixel of a plurality of pixels of a first image of said video signal and pixel data of a corresponding first pixel of a corresponding plurality of pixels of a second image of said video signal exceeding a threshold,
dividing, by the one or more signature extraction units, the counter value by a value proportional to the number of the plurality of pixels, and
generating, by the one or more signature extraction units, a video signature signal for said video signal comprising the divided counter value, the video signature representative of content of said video signal;
performing, by a signature analysis unit, a convolution of the first video signature signal representative of content of the first video signal and the second video signature signal representative of content of the first video signal processed by one or more intermediary processors to generate a first convolution signal;
calculating, by the signature analysis unit, a video matching factor inversely proportional to a minimum value of the first convolution signal divided by a sum of one of the first and second video signature signals;
determining, by the signature analysis unit, that the first video signal and second video signature are correlated, responsive to the value of the video matching factor being above a first predetermined threshold;
identifying, by the signature analysis unit, a video delay between the correlated first video signal and correlated second video signal, responsive to the determination, the video delay representative of a delay induced during processing of the first video signal by the one or more intermediary processors; and automatically setting a signal delay based on the identified video delay.

13. The method of claim 12, further comprising:

for each of a first audio signal associated with the first video signal and a second audio signal associated with the second video signal comprising the first audio signal after the at least one transmission operation:
- assigning, by the one or more signature extraction units, a plurality of values responsive to a corresponding plurality of comparisons of a first filtering of said audio signal to a second filtering of said audio signal, the second filtering different from the first filtering, and
- decimating the plurality of assigned values to generate an audio signature signal representative of content of said audio signal;

performing, by the signature analysis unit, a convolution of the first audio signature signal representative of content of the first audio signal and second audio signature signal representative of content of the second audio signal to generate a second convolution signal;

calculating, by the signature analysis unit, an audio matching factor inversely proportional to a minimum value of the second convolution signal divided by a size of one of the first and second audio signature signals;

determining, by the signature analysis unit, that the first audio signature signal and second audio signature signal are correlated, responsive to the value of the audio matching factor being above a second predetermined threshold; and identifying, by the signature analysis unit, an audio delay between the correlated first audio signal and correlated second audio signal, responsive to the determination, the audio delay representative of a delay induced during the at least one transmission operation.

14. The method of claim 13, further comprising:

determining, by the signature analysis unit, that the identified video delay is different from the identified audio delay; and wherein automatically setting a signal delay based on the identified video delay further comprises automatically setting a signal delay based on a difference between the identified video delay and the identified audio delay.

* * * * *